United States Patent [19]

Hanes

[11] Patent Number: 5,391,619
[45] Date of Patent: Feb. 21, 1995

[54] POLY(ETHYLENE TEREPHTHALATE) AND MONOVINYLARENE/CONJUGATED DIENE BLOCK COPOLYMER BLENDS

[75] Inventor: Mark D. Hanes, Bartlesville, Okla.

[73] Assignee: Phillips Petroleum Company, Bartlesville, Okla.

[21] Appl. No.: 139,359

[22] Filed: Oct. 19, 1993

[51] Int. Cl.⁶ .................... C08L 53/02; C08L 67/02
[52] U.S. Cl. ........................................ 525/92; 524/505
[58] Field of Search .......................................... 525/92

[56] References Cited

U.S. PATENT DOCUMENTS

| | | | |
|---|---|---|---|
| 4,141,863 | 2/1979 | Coran | 525/177 |
| 4,301,255 | 11/1981 | Korpman | 525/92 |
| 4,745,148 | 5/1988 | Chung et al. | 524/504 |
| 5,149,734 | 9/1992 | Fisher et al. | 524/423 |

*Primary Examiner*—Patricia A. Short
*Attorney, Agent, or Firm*—Marianne H. Michel

[57] ABSTRACT

A composition comprising a poly(ethylene terephthalate), a monovinylarene/conjugated diene block copolymer, and an organic peroxide is provided. A process for preparing the composition and articles prepared from the composition are also provided

17 Claims, No Drawings

POLY(ETHYLENE TEREPHTHALATE) AND MONOVINYLARENE/CONJUGATED DIENE BLOCK COPOLYMER BLENDS

This invention relates to blends comprising poly(ethylene terephthalate) and monovinylarene/conjugated diene block copolymer.

BACKGROUND

Copolymers of monovinylarene/conjugated diene are known and useful for a variety of purposes. Of particular interest are polymers that can be formed into colorless, transparent articles having good physical properties. The polymers should also exhibit sufficient thermal stability to be suitable for use with conventional injection molding equipment. Certain applications require polymers having especially high impact resistance.

It would therefore be desirable to develop polymer blends having high impact strength.

SUMMARY OF THE INVENTION

It is an object of this invention to provide a polymer blend having improved impact strength.

In accordance with this invention a composition comprising a poly(ethylene terephthalate), a monovinylarene/conjugated diene block copolymer, and an organic peroxide is provided.

In accordance with other aspects of this invention, a process for preparing the composition and articles prepared therefrom are also provided.

DETAILED DESCRIPTION OF THE INVENTION

The polymers employed in the present invention can be produced by any means known in the art. Many suitable polymers are commercially available.

The monovinylarene/conjugated diene block copolymers useful in this invention are block copolymers having a melt flow greater than 0.1 g/10 min., preferably in the range of from about 0.1 g/10 min. to about 100 g/10 min. measured according to ASTM D1238, Condition G. Generally, the monovinylarene/conjugated diene block copolymers are prepared by a solution process involving sequential polymerization of a monovinylarene monomer and a conjugated diene monomer. Optionally, a monovinylarene monomer/conjugated diene monomer mixture can be polymerized to form a monovinylarene/conjugated diene block. In some circumstances the polymer chains can be coupled to form multimodal block copolymers having a broad molecular weight distribution.

The basic starting materials and polymerization conditions for preparing monovinylarene/conjugated diene block copolymer are disclosed in U.S. Pat. Nos. 2,975,160; 4,091,053; 4,584,346; and 4,704,434, the disclosures of which are hereby incorporated by reference.

In a preparation method typical of these publications, a conjugated diene monomer and a monovinylarene monomer are copolymerized sequentially in the presence of an initiator and a hydrocarbon solvent.

Suitable conjugated dienes which can be used in the copolymers include those having 4 to 12 carbon atoms per molecule, with those having 4 to 8 carbon atoms preferred. Examples of such suitable compounds include 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof. The preferred dienes are 1,3-butadiene and isoprene, most preferably 1,3-butadiene.

Suitable monovinylarene compounds which can be used in the copolymers include those having 8 to 18 carbon atoms per molecule, preferably 8 to 12 carbon atoms. Examples of such suitable compounds include styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl) styrene, 1-vinylnaphthalene, 2-vinylnaphthalene, and mixtures thereof. Styrene is the preferred monovinylarene compound.

Generally, the monovinylarene monomer is present in the final block copolymer in an amount in the range of from about 50 weight percent to about 95 weight percent based on the total weight of the final block copolymer, preferably in the range of from about 60 weight percent to about 95 weight percent, and more preferably in the range of from 70 weight percent to 90 weight percent. Generally the conjugated diene monomer will be present in the final block copolymer in an amount in the range of from about 50 weight percent to about 5 weight percent based on the total weight of the final block copolymer, preferably in the range of from about 40 weight percent to about 5 weight percent, and more preferably in the range of from 30 weight percent to 10 weight percent.

The term "poly(ethylene terephthalate)" as used herein is used generally to include high molecular weight polymers made by condensing ethylene glycol with terephthalic acid or dimethylterephthalate, no matter how prepared. This term is meant to include poly(ethylene terephthalate) polymers which are modified by the inclusion of minor amount, e.g., less than about 20 percent by weight of the polymer, of comonomers or modifying agents. Such comonomers or modifying agents include various diols such as 1,4-butanediol, cyclohexane dimethanol, diethylene glycol, hydrolyzed polyalkylene oxides, neopentyl glycol, butylene glycol, 1,3-propanediol, and mixtures thereof. Likewise, such comonomers or modifying agents can include various diacids such as isophthalic acid, adipic acid, sebacic acid, 2,6-naphthalene dicarboxylic acid, hydroxy acids such as p-hydroxy benzoic acid, and mixtures thereof. Mixtures of poly(ethylene terephthalate) resins can be used. Suitable poly(ethylene terephthalate) polymers are commercially available.

The poly(ethylene terephthalate) employed herein generally has an inherent viscosity of at least about 0.25, preferably about 0.6 as measured by ASTM D-2857. The poly(ethylene terephthalate) preferably has an upper limit on inherent viscosity of about 1.2. Inherent viscosity is measured in a 3:1 volume ratio of methylene chloride and trifluoroacetic acid at 30° C.

The composition of the polymer blend can vary broadly. Generally the poly(ethylene terephthalate) is present in an amount in the range of from about 5 weight percent to about 95 weight percent based on the total weight of the polymer blend, preferably from about 20 weight percent to about 70 weight percent, and more preferably from 30 weight percent to 50 weight percent. Generally the monovinylarene/conjugated diene block copolymer is present in an amount in the range of from about 95 weight percent to about 5 weight percent based on the total weight of the polymer blend, preferably from about 80 weight percent to about 30 weight percent, and more preferably from 70 weight percent to 50 weight percent.

Organic peroxides useful in this invention include alkyl, cycloalkyl, aromatic, alkene, and alkyne peroxides. Examples of suitable peroxides include diethyl peroxide, diacetyl peroxide, dicrotonyl peroxide, di-tert-buty peroxide, dibenzoyl peroxide, cumyl peroxide, dilauryl peroxide, perbenzoic acid, peracetic acid, tert-butyl perbenzoate, monoperphthalic acid, perbutyric acid, monopersuccinic acid, diperterephthal acid, percinnamic acid, di-tert-butyl diperphthalate, dimethyl-diperphthalate, trans-decalylperbenzoate, tert-butyl peracetate, bis(tert-butylperoxy)-diisopropylbenzene, and mixtures thereof. Preferred compounds are organic peroxides having a thermal decomposition temperature in the range of 125° C. to 225° C. and containing 4 to 24 carbon atoms. Excellent results have been obtained with bis(tert-butylperoxy)-diisopropylbenzene and it is preferred.

The amount of organic peroxide employed can vary broadly depending on the specific peroxide the and individual polymers employed and is the amount sufficient to improve the impact strength of the polymer blend. Generally the amount of organic peroxide employed will be in the range of from about 0.001 weight percent to about 0.50 weight percent based on the total weight of the polymer blend, preferably from about 0.001 weight percent to about 0.25 weight percent, more preferably from 0.001 weight percent to 0.10 weight percent, and most preferably from 0.001 weight percent to 0.075 weight percent. In an especially preferred embodiment, bis(tert-butylperoxy)-diisopropylbenzene is employed in an amount in the range of from 0.001 weight percent to 0.05 weight percent based on the weight of the polymer blend.

Blending can be accomplished by any method known in the art. Preferably the polymers are melt blended employing any desired means such as a Banbury mixer, a hot roll, or an extruder. More preferably the polymers are melt blended employing extruder blending techniques. Single or twin screw extruders can be utilized. The polymers can be dry blended prior to the melt blending.

The blending conditions depend upon the blending technique and polymers employed. If an initial dry blending of the polymer is employed, the blending conditions may include temperatures from room temperature up to just under the melting temperature of the polymer, and blending times in the range of a few seconds to hours, e.g. 2 seconds to 30 minutes.

During the melt blending, the temperature at which the polymers are combined in the blender will generally be in the range between the highest melting point of the polymers employed and up to about 200° C. above such melting point, preferably between such melting point and up to 160° C. above such melting point.

The time required for the melt blending can vary broadly and depends on the method of blending employed. The time required is the time sufficient to thoroughly mix the components. Generally, the individual polymers are blended for a time of about 10 seconds to about 15 minutes.

It is preferred that the poly(ethylene terephthalate) and the monovinylarene/conjugated diene polymers are blended prior to blending with the organic peroxide.

The polymer blends can contain additives such as stabilizers, anti-oxidants, anti-blocking agents, mold release agents, crystallization promoters, dyes and pigments, flame retardants, as well as fillers and reinforcing agents, such as glass fibers.

The polymer blends prepared according to the invention are useful for the production of articles prepared by milling, extrusion or injection molding.

The following examples are presented to further illustrate the invention and are not meant to limit the scope thereby.

EXAMPLE

The following example demonstrates the improvement in impact strength of blends prepared with a peroxide.

Commercial styrene/butadiene block copolymer and glycol modified poly(ethylene terephthalate) were blended employing a W & P ZSK-30 twin screw extruder. The styrene/butadiene block copolymer was prepared employing a sequential solution polymerization according to the process described in U.S. Pat. No. 4,584,346, available from Phillips Petroleum Co. as KR03. The weight ratio of styrene to butadiene in the styrene/butadiene block copolymer was 75/25. The poly(ethylene terephthalate) employed was a glycol modified poly(ethylene terephthalate), Kodar 6763, purchased from Eastman Chemical. The polymers were blended employing 1500 g of each polymer, a weight ratio of 50/50. The peroxide employed was bis(tert-butylperoxy)-diisopropylbenzene, available from Hercules Inc. as VUL-CUP R ®, which was blended in the amount indicated in Table 1 as weight percent based on the total polymer blend.

The notched Izod impact strength in ft-lb/in was measured according to ASTM D-256. The results are summarized in Table 1. Peroxide is the weight percent peroxide employed based on the total polymer blend.

TABLE 1

| Run | Peroxide wt. % | Notched Izod Impact ft-lb/in |
|-----|----------------|------------------------------|
| 101 | 0              | 3.05                         |
| 102 | 0.003          | 3.74                         |
| 103 | 0.017          | 4.27                         |
| 104 | 0.030          | 4.18                         |
| 105 | 0.070          | 3.22                         |
| 106 | 0.170          | 2.43                         |

Table 1 demonstrates that polymers blended employing a peroxide in an amount in the range of from about 0.001 wt. % to about 0.075 wt. % exhibited an improvement in Izod impact strength as great as 40%.

That which is claimed is:

1. A composition comprising a poly(ethylene terephthalate), a monovinylarene/conjugated diene copolymer, and an organic peroxide,
   wherein monovinylarene is present in said monovinylarene/conjugated diene copolymer in an amount in the range of from about 60 weight percent to about 95 weight percent based on the weight of the monovinylarene/conjugated diene block copolymer, and
   wherein conjugated diene is present in said monovinylarene/conjugated diene copolymer in an amount in the range of from about 40 weight percent to about 5 weight percent based on the weight of the monovinylarene/conjugated diene block copolymer.

2. A composition according to claim 1 wherein said organic peroxide is present in an amount in the range of from about 0.001 weight percent to about 0.50 weight percent based on the total polymer blend.

3. A composition according to claim 2 wherein said organic peroxide is present in an amount in the range of from about 0.001 weight percent to about 0.25 weight percent based on the total polymer blend.

4. A composition according to claim 3 wherein said organic peroxide is present in an amount in the range of from 0.001 weight percent to 0.10 weight percent based on the total polymer blend.

5. A composition according to claim 4 wherein said organic peroxide is present in an amount in the range of from 0.001 weight percent to 0.075 weight percent based on the total polymer blend.

6. A composition according to claim 1, wherein said organic peroxide has a thermal decomposition temperature in the range of 125° C. to 225° C. and contains 4 to 24 carbon atoms.

7. A composition according to claim 6 wherein said organic peroxide is bis(tert-butylperoxy)-diisopropylbenzene.

8. A composition according to claim 7 wherein said organic peroxide is present in an amount in the range of from 0.001 weight percent to 0.05 weight percent based on the total polymer blend.

9. A composition according to claim 1 wherein said poly(ethylene terephthalate) is present in an amount in the range of from about 5 weight percent to about 95 weight percent based on the total weight of the polymer blend, and
wherein said monovinylarene/conjugated diene block copolymer is present in an amount in the range of from about 95 weight percent to about 5 weight percent based on the total polymer blend.

10. A composition according to claim 9 wherein said poly(ethylene terephthalate) is present in an amount in the range of from about 20 weight percent to about 70 weight percent based on the total weight of the polymer blend, and
wherein said monovinylarene/conjugated diene block copolymer is present in an amount in the range of from about 80 weight percent to about 30 weight percent based on the total polymer blend.

11. A composition according to claim 10 wherein said poly(ethylene terephthalate) is present in an amount in the range of from about 30 weight percent to about 50 weight percent based on the total weight of the polymer blend, and
wherein said monovinylarene/conjugated diene block copolymer is present in an amount in the range of from about 70 weight percent to about 50 weight percent based on the total polymer blend.

12. A composition according to claim 1 wherein said poly(ethylene terephthalate) is a glycol modified poly(ethylene terephthalate).

13. A composition according to claim 1 wherein said monovinylarene in monovinylarene/conjugated diene block copolymer is styrene.

14. A composition according to claim 1 wherein said conjugated diene in said monovinylarene/conjugated diene block copolymer is butadiene.

15. A composition according to claim 1
wherein said monovinylarene in said monovinylarene/conjugated diene block copolymer is present in an amount in the range of from 70 weight percent to 90 weight percent based on the weight of the monovinylarene/conjugated diene block copolymer and
wherein said conjugated diene is present in an amount in the range of from 30 weight percent to 10 weight percent based on the weight of the monovinylarene/conjugated diene block copolymer.

16. An article made from the composition of claim 1.

17. A composition prepared by blending a monovinylarene/conjugated diene block copolymer, a poly(ethylene terephthalate), and an organic peroxide;
wherein monovinylarene is present in said monovinylarene/conjugated diene copolymer in an amount in the range of from about 60 weight percent to about 95 weight percent based on the weight of the monovinylarene/conjugated diene block copolymer, and
wherein conjugated diene is present in said monovinylarene/conjugated diene copolymer in an amount in the range of from about 40 weight percent to about 5 weight percent based on the weight of the monovinylarene/conjugated diene block copolymer.

* * * * *